(12) United States Patent
Keller

(10) Patent No.: US 8,555,247 B2
(45) Date of Patent: Oct. 8, 2013

(54) SYSTEMS AND METHODS FOR EXPRESSING TEMPORAL RELATIONSHIPS SPANNING LIFECYCLE REPRESENTATIONS

(75) Inventor: Alexander Keller, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1702 days.

(21) Appl. No.: 11/549,356

(22) Filed: Oct. 13, 2006

(65) Prior Publication Data
US 2008/0189324 A1    Aug. 7, 2008

(51) Int. Cl.
*G06F 9/44*    (2006.01)

(52) U.S. Cl.
USPC .............. 717/120; 717/114; 717/127

(58) Field of Classification Search
None
See application file for complete search history.

(56) References Cited

U.S. PATENT DOCUMENTS

| | | | |
|---|---|---|---|
| 4,751,635 A | 6/1988 | Kret | |
| 5,493,682 A | 2/1996 | Tyra et al. | |
| 5,721,824 A * | 2/1998 | Taylor | 709/203 |
| 5,805,891 A | 9/1998 | Bizuneh et al. | |
| 5,835,777 A | 11/1998 | Staelin | |
| 5,867,714 A | 2/1999 | Todd et al. | |
| 5,960,196 A | 9/1999 | Carrier, III et al. | |
| 5,999,740 A | 12/1999 | Rowley | |
| 6,009,525 A | 12/1999 | Horstmann | |
| 6,240,544 B1 * | 5/2001 | Kaneko | 717/135 |
| 6,675,382 B1 * | 1/2004 | Foster | 717/177 |
| 6,847,970 B2 * | 1/2005 | Kar et al. | 1/1 |
| 6,865,429 B1 * | 3/2005 | Schneider et al. | 717/120 |
| 7,096,459 B2 * | 8/2006 | Keller et al. | 717/127 |
| 7,272,815 B1 * | 9/2007 | Eldridge et al. | 717/114 |
| 7,496,912 B2 * | 2/2009 | Keller et al. | 717/120 |
| 7,509,627 B1 * | 3/2009 | Ayachitula et al. | 717/101 |
| 7,707,549 B2 * | 4/2010 | Chudukatil et al. | 717/120 |
| 8,001,527 B1 * | 8/2011 | Qureshi et al. | 717/127 |
| 8,051,404 B2 * | 11/2011 | McGovern et al. | 717/114 |
| 8,108,836 B1 * | 1/2012 | Campbell et al. | 717/127 |
| 8,127,267 B2 * | 2/2012 | Carrigan | 717/120 |
| 8,239,828 B2 * | 8/2012 | Liu et al. | 717/120 |
| 8,332,842 B2 * | 12/2012 | Bauer et al. | 717/120 |

(Continued)

OTHER PUBLICATIONS

Dr. Kristin Stock; Spatio-Temporal Data Management Using Object Lifecycles; [2006]; retrieved online on May 24, 2013; pp. 1-27; Retrieved from the Internet: <URL: http://www.google.com/url?>.*

(Continued)

*Primary Examiner* — Thuy Dao
*Assistant Examiner* — Hanh T Bui
(74) *Attorney, Agent, or Firm* — Louis J. Percello; Ryan, Mason & Lewis, LLP

(57) ABSTRACT

Techniques for expressing temporal relationships between lifecycle representations are provided. For example, one computer-implemented technique includes obtaining two or more lifecycle representations of at least two components of at least one computing system, annotating the two or more lifecycle representations with at least one temporal relationship, and storing the two or more annotated lifecycle representations as at least one deployment descriptor, wherein the at least one deployment descriptor is useable for managing the at least one computing system. In another computer-implemented technique, at least two internal lifecycle models of at least two components of at least one computing system are analyzed, at least one temporal relationship that exists between the at least two components are analyzed, and the at least one temporal relationship is transformed into at least one sequence of change management operations for use in managing the at least one computing system.

17 Claims, 6 Drawing Sheets

(56) References Cited

U.S. PATENT DOCUMENTS

| | | | |
|---|---|---|---|
| 2003/0005412 A1* | 1/2003 | Eanes | 717/120 |
| 2003/0041131 A1* | 2/2003 | Westerinen et al. | 709/221 |
| 2003/0200531 A1* | 10/2003 | Fairweather | 717/114 |
| 2005/0192979 A1* | 9/2005 | Keller et al. | 707/100 |
| 2005/0193381 A1* | 9/2005 | Hellerstein et al. | 717/144 |
| 2006/0101402 A1* | 5/2006 | Miller et al. | 717/124 |
| 2006/0200800 A1* | 9/2006 | Melby | 717/114 |
| 2007/0157169 A1* | 7/2007 | Chen et al. | 717/120 |
| 2007/0162482 A1* | 7/2007 | Flaxer et al. | 707/101 |
| 2008/0127089 A1* | 5/2008 | Peretz et al. | 717/122 |
| 2008/0168424 A1* | 7/2008 | Mohindra et al. | 717/120 |
| 2008/0222604 A1* | 9/2008 | Murphy | 717/120 |
| 2008/0250393 A1* | 10/2008 | Bolene et al. | 717/120 |
| 2010/0269098 A1* | 10/2010 | Debruin et al. | 717/114 |
| 2012/0159437 A1* | 6/2012 | Du et al. | 717/120 |

OTHER PUBLICATIONS

Alessandro Artale et al.; Evolving Objects in Temporal Information Systems; [2007]; retrieved online on May 24, 2013; pp. 1-36; Retrieved from the Internet: <URL: http://infoscience.epfl.ch/record/105048/files/amai-submission-07.pdf>.*

Alex C. Meng; Logos-TCS: An Expert System Language for Operations Management based on Temporal Constraint Satisfaction; [1990]; retrieved online on May 24, 2013; pp. 214-221; Retrieved from the Internet: <URL: http://ieeexplore.ieee.org/stamp/stamp.jsp?tp=&arnumber=89192>.*

U.S. Appl. No. 10/789,123, filed Feb. 27, 2004, A. Keller et al. entitled "Methods and Arrangements for Ordering Changes in Computing Systems.".

* cited by examiner

FIG. 6

```xml
<requirement name="Install_bestsellServlet_Reqmt" operations="Install">
  <alternative name="Linux Alternative">
    <checkItem checkIdRef="Linux_Check"/>
    <checkItem checkIdRef="Linux_version_Check"/>
    <checkItem checkIdRef="WAS_for_Linux_installedCheck"/>
    <checkItem checkIdRef="WAS_for_Linux_StartedCheck" testValue="started"/>
  </alternative>
  <alternative name="Win2K_Alternative">
    <checkItem checkIdRef="Windows_2000_Check"/>
    <checkItem checkIdRef="Windows_version_Check"/>
    <checkItem checkIdRef="WAS_for_Windows_InstalledCheck"/>
    <checkItem checkIdRef="WAS_for_Windows_StartedCheck" testValue="started"/>
    <checkItem checkIdRef="ACME_Personal_Firewall_Check" testValue="false"/>
  </alternative>
  <alternative name="IsWinXP_Alternative">
    <checkItem checkIdRef="WindowsXP_Check"/>
    <checkItem checkIdRef="WAS_for_Windows_Installedcheck"/>
    <checkItem checkIdRef="WAS_for_Windows_StartedCheck" testValue="started"/>
    <checkItem checkIdRef="ACME_Personal_Firewall_Check" testValue="false"/>
    <checkItem checkIdRef="IUXREQ_Check" testValue="false"/>
  </alternative>
</requirement>
<requirement name="ConfigureJDBC_connectors" operations="Configure">   ← 640
  <alternative name="isDB2_Installed" priority="1">                   ← 610
    <checkItem checkIdRef="DB2_InstalledCheck"/>                      ← 620
    <checkItem checkIdRef="DB2_StartedCheck" testValue="started"/>    ← 630
  </alternative>
  <alternative name="isCloudscape_Installed" priority="2">
    <checkItem checkIdRef="Cloudscape_InstalledCheck"/>
    <checkItem checkIdRef="Cloudscape_StartedCheck" testValue="started"/>
  </alternative>
  <alternative name="isDBZ_Installed" priority="1">
    <checkItem checkIdRef="DBZ_Check"/>
  </alternative>
</requirement>
```

SYSTEMS AND METHODS FOR EXPRESSING TEMPORAL RELATIONSHIPS SPANNING LIFECYCLE REPRESENTATIONS

FIELD OF THE INVENTION

The present invention relates to distributed computing systems and, more particularly, to systems and methods for expressing temporal relationships spanning lifecycle representations.

BACKGROUND OF THE INVENTION

Implementing changes for hardware, software, network, and storage systems in large-scale electronic business (e-business) environments is known to be quite burdensome to customers. Rolling out changes, such as installing or uninstalling, upgrading or configuring systems can take weeks, partly because the complex interdependencies between applications and their supporting services are not made explicit, thus requiring human involvement and expertise. Solving this change management problem automatically is important to address the increasing complexity of computing systems. The number of relationships of a single computing resource (for example, a software component, a network component, and/or a storage system) may range from 10 to 100. The number of computing resource instance relationships in large-scale enterprise systems is often between 1,000,000 and 1,000,000,000. Given that a change to one or more computing resources may entail additional changes on a multitude of other computing resources, it is evident that the need for human involvement in the change management process needs to be minimized.

Change management is a process that offers many automation challenges. The organizational frameworks behind existing change management processes tend to be ill-defined and highly variable in detail and formality. This makes it difficult to identify tasks for automation or to reuse standardized automation across environments within or between information technology (IT) organizations (a particular problem for corporate mergers). Additionally, effective change management requires a great deal of accurate information on technical constraints, such as dependencies between IT services, the components that implement them, and the infrastructure supporting them. This information is rarely documented formally or kept up-to-date, hindering change assessment and change impact prediction.

Existing approaches in the area of software development include U.S. Pat. No. 4,751,635, which includes a support system that provides data that reflects one or more aspects of a lifecycle of a development project, and U.S. Pat. No. 5,960,196, which includes generating a report to summarize computed metrics.

Existing approaches in the area of software maintenance include U.S. Pat. No. 5,493,682, which includes assembling executable systems from defined component parts such as source code files and object code files.

Existing approaches in the area of software packaging include U.S. Pat. No. 5,835,777, which includes a method of automatically generating a software installation package.

Techniques for electronic software distribution of whole program packages, such as U.S. Pat. No. 6,009,525, include methods of electronic software distribution in which software products may be wrapped by their publishers in a straightforward, secure manner, but in such a way as to allow for the addition of information by downstream distribution channel partners. Such techniques also include U.S. Pat. No. 5,721,824, which includes installation of a multi-package distribution software pack.

Techniques for updates, corrections, fixes and/or patches, such as U.S. Pat. No. 5,999,740, include a software update mechanism in the computer that accesses a remote file server to obtain a release file containing a list of software applications available from the remote server, and compares the release file with the registration file to determine which of the installed applications have upgrades available. Such techniques also include U.S. Pat. No. 5,805,891, which includes managing the maintenance of computer software by receiving a software maintenance module and verifying the validity of the software maintenance module.

Techniques for determining conflicts in existing software and/or hardware configurations, such as U.S. Pat. No. 5,867,714, include techniques for distributing configuration-dependent software revisions to a computer system.

Existing approaches to the computer resource change management problem often include individual software elements and modules that form the atomic parts of a program package and require the availability of program source code in order to build software and bundle it into software products. Source code is available to the software developer and not to the software user or system administrator. Furthermore, other existing approaches are, by definition, restricted to the distribution, deployment or installation of (one or many at a time) physical software packages and do not take the runtime stages of applications into account. In addition, such existing approaches include one system at a time and do not take the cross-system aspects of applications and services into account.

It would thus be desirable to overcome these and other limitations in computer resource change management approaches.

SUMMARY OF THE INVENTION

Principles of the present invention provide techniques for expressing temporal relationships between lifecycle representations of components of one or more computing system.

For example, in one aspect of the invention, a computer-implemented technique for expressing temporal relationships between lifecycle representations includes the following steps. Two or more lifecycle representations of at least two components of at least one computing system are obtained. The two or more lifecycle representations are annotated with at least one temporal relationship. The two or more annotated lifecycle representations are stored as at least one deployment descriptor. The deployment descriptor is useable for managing the at least one computing system.

In another aspect of the invention, a computer-implemented technique includes the steps of analyzing at least two internal lifecycle models of at least two components o at least one computing system, analyzing at least one temporal relationship that exists between the at least two components, and transforming the at least one temporal relationship into at least one sequence of change management operations for use in managing the at least one computing system.

In contrast to the above-mentioned limitations in existing approaches, principles of the invention overcome such shortcomings by accounting for temporal dependency relationships in the lifecycles of components of a distributed system.

One or more embodiments of the invention may provide one or more beneficial technical effects, such as, for example, specifying temporal dependency relationships by linking lifecycle models of two or more components. Furthermore, one or more embodiments of the invention may provide one or more beneficial technical effects, such as, for example, including already packaged software products.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 is a diagram illustrating the textual representation of temporal relationships by way of a deployment descriptor, according to an embodiment of the present invention;

DETAILED DESCRIPTION OF PREFERRED EMBODIMENTS

The identification and tracking of relationships between the components of distributed computing systems is critically important for automated change management. For example, software components rely on a variety of supporting components. Consequently, applying a change to one component affects other components, i.e., components have dependencies on other components. Dependencies exist between components on a single system and also between the components on multiple systems and organizational domains. For this discussion, we call components that depend on others "dependents," while components on which other components depend are termed "antecedents."

As used herein, "component" refers to a computing resource, and two or more components may refer to two identical computing resources or two distinct computing resources. Further, as used herein, "computing system" refers to a system including one or more components or computing resources. Also, as used herein, "lifecycle" refers to a model including the set of possible states of a component along with the operations that transition a component from one state to another, and "lifecycle representation" refers to a human- or machine-readable description of a lifecycle. As used herein, "temporal relationship" refers to a vertex connecting states in the lifecycles of two or more components. Further, as used herein, "annotating" refers to adding information, for example, to one or more lifecycle representations and/or a relationship associated therewith.

Also, as used herein, "symbolic names" refer to denoting the role a system is playing in the distributed computing environment (for example, application server, web server, database server). Further, as used herein, "hosting environment" refers to a container into which components can be deployed and executed.

A component often plays both roles (for example, a component providing a name service is required by many applications and services but is depending, itself, on the proper functioning of other components, such as the operating system and the network protocols and infrastructure), thus leading to a dependency hierarchy that can be modeled as a directed graph. Furthermore, dependency relationships are transitive, i.e., the dependent of a given component requires, in addition to the component itself, also the components' antecedent(s). Dependencies exist between various components of a distributed system, such as end-user services, system services, applications, networking infrastructure components, and their logical and physical components.

The representation of dependency relationships in existing systems is confined to dependencies that apply to components that are in the same state of the managed resource lifecycle. An example of a dependency as it is understood in existing approaches is "dependent X can only be started (brought into an executable state) if antecedent Y is in an executable state."

Figure 1:
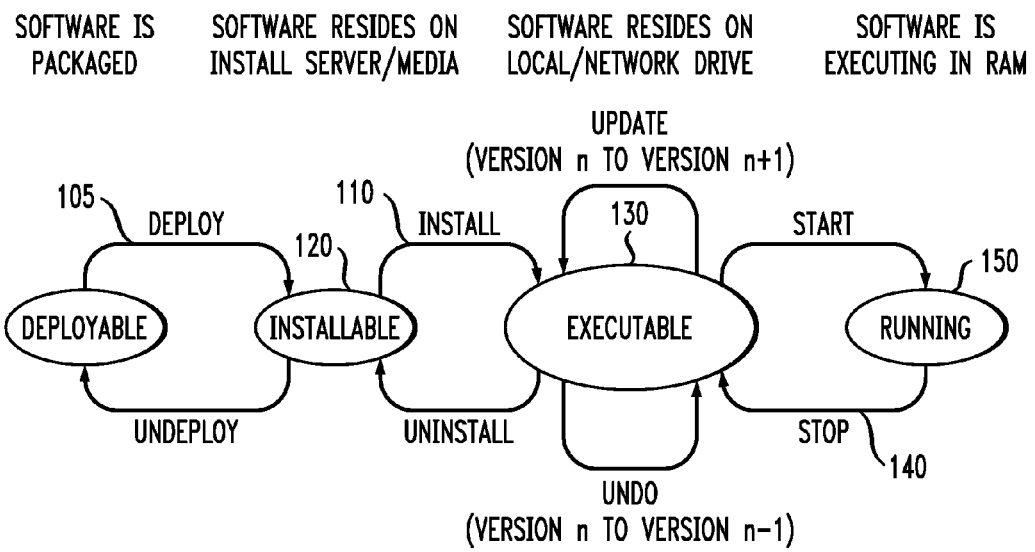
FIG. 1 is a diagram illustrating an example of an existing approach to component lifecycle management.

This notion of dependencies does not account for temporal dependency relationships, i.e., the lifecycle of the components of a distributed system. For illustrative purposes, FIG. 1 depicts an existing approach to component lifecycle management, which typically represents the software application lifecycle in the following states:

Deployable (105): The software is packaged as a deployable image by a build system and is ready for delivery.

Installable (120): The software image resides on a locally accessible install medium (CD-ROM, DVD-ROM, tape, etc.) or on one or more network-accessible install servers.

Executable (130): The software installation resides on a local or networked drive and no constraint forbids its instantiation. We note that there is a subtle difference between the executable state and an installed state that is sometimes found in the literature. While executable includes installed, the opposite is not always true as there may be temporal relationships that forbid the start of an installed component (for example, if a component can only be run as a single instance, for example, a singleton), or if additional configuration is needed to bring an installed component into an executable state. In case the executable state is broken down into two substates installed and executable, these states are typically linked with a configure change management operation.

Running (150): The software is executing in the random access memory (RAM) of a computing system.

We note that states later in the lifecycle of a component are discrete, as they do not include previous lifecycle states. For example:

A running component is not necessarily in the executable state. While a component is installed in order to be started, it is possible that only a single instance of the component can be run at any given time.

An installable component is not in the deployable state as it is already residing in a location where it is ready for the installation.

Furthermore, there are several change management operations (for example, deploy, install, update, start, stop, undo, uninstall, undeploy, etc.) that transition a managed resource from one state to another. As an example, the install change management operation 110 moves a managed resource from the installable state 120 to the executable state 130, whereas the stop change management operation 140 moves a managed resource from the running state 150 to the executable state 130.

In some cases, the sequential relationships of states in a lifecycle model include previous states. For example, the running state 150 implies that a component is in the executable state 130. The antecedent is installed (i.e., be in the executable state).

However, merely considering the lifecycle of an individual, isolated system is insufficient for supporting the complex dependencies that exist in modern distributed systems. The following are examples for such temporal dependency relationships in which the participating components need to be in different states of their lifecycle for the change management operation to succeed:

In order to install a patch for an Application Server, the server software is stopped. Example: "patch Application Server with fix: stop Application Server→patch Application Server→start Application Server".

In order to install/update a software artifact X, another artifact Y needs to be stopped (table/DBMS). Example: "Update CC_XACTS table: stop DBMS→remove CC_XACTS table→load new CC_XACTS table→start DBMS".

To install a servlet, the servlet container of the application server is running.

To uninstall a servlet, the servlet container of the application server is running.

Such temporal dependency relationships typically exist, for example, if a component hosts one or more other components (for example, it acts as a logical container in which the other components execute). Examples for such hosting environments may include operating systems, programming language interpreters, or the web, servlet and Enterprise JavaBeans (EJB) containers of application servers.

Techniques of the invention described herein illustrate an approach to express temporal dependency relationships spanning lifecycle representations, which existing approaches do not take into account. One or more embodiments of the inventive techniques provide methods and systems for expressing complex temporal relationships that cross the various states in the lifecycle of (distributed) computing systems.

In contrast to the aforementioned existing approaches, one or more embodiments of the techniques of the invention obtain lifecycle representations for one or more components and generates precedence constraints from temporal relationships. Examples of such precedence constraints include:

The change management operation for component X finishes before the change management operation for component Y can begin, the change management operation for component X cannot start until the change management operation for component Y does, the change management operation for component X cannot finish before the change management operation for component Y does, the change management operation for component X cannot finish until the change management operation for component Y starts.

These precedence constraints apply to various types of change tasks, such as, for example, install, uninstall, configure, start and stop.

Temporal relationships are different from precedence constraints. While temporal relationships exist between the lifecycle states of two or more components, precedence constraints link a set of change management operations by specifying the order in which they are to be carried out. Change management operations transition a given component from one state in its lifecycle into another state.

One or more embodiments of the inventive techniques address temporal relationships in distributed systems that arise from the states of the components' lifecycle in a distributed system. The inventive techniques are not bound to a specific state model that represents the lifecycle, but can work with any model that describes the lifecycle. The techniques apply both to the set of possible states a component can have, as well as to the operations that transition a component from one state into another.

In a specific embodiment of the present invention, the inventive techniques generate allowable sequences of change management operations (for example, change plans) from temporal relationships and lifecycle representations.

One or more embodiments of the inventive techniques specify such temporal dependency relationship information by linking the lifecycle models of two or more components. One having skill in the relevant art will recognize that modifications in the way dependencies are obtained by a system, as well as their representation, may be made without departing from the spirit and scope of the present invention. In particular, one or more embodiments of the inventive techniques can be applied to any lifecycle model, as it makes no assumptions on the number of possible states (such as, for example, deployable, installable, executable or running) and on their transitions.

Given the above realizations made in accordance with one or more embodiments of the present invention, and general features associated with one or more embodiments of the present invention, the remainder of the detailed description will provide an illustrative explanation of techniques for implementing such realizations and features in the context of FIGS. 2 through 9.

Figure 2:
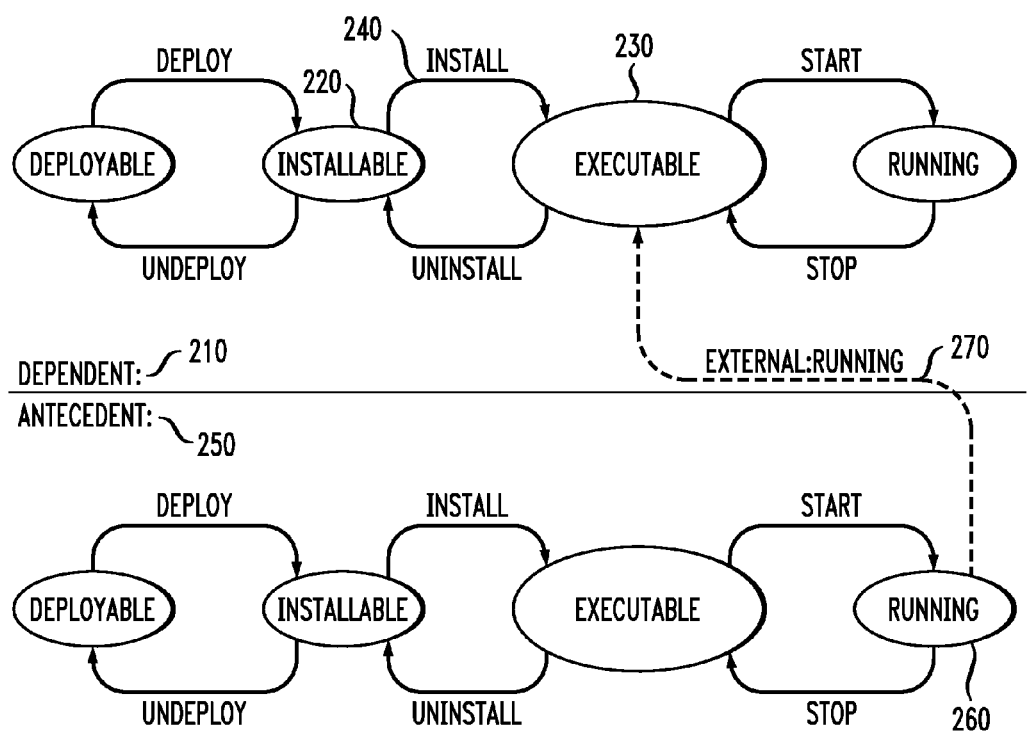
FIG. 2 is a diagram illustrating temporal relationships between lifecycle representations of multiple components, according to an embodiment of the present invention.

FIG. 2 is a diagram illustrating temporal relationships between lifecycle representations of multiple components, according to an embodiment of the present invention. Lifecycle diagrams and change management operations that transition a component from one state in its lifecycle to another are depicted for both antecedent component 250 and dependent component 210. In this graphical depiction, a temporal relationship 270 connects the lifecycle models of both components. The source of the relationship is the running lifecycle state 260 of the antecedent, the target is the executable lifecycle state 230 of the dependent. The temporal relationship external:running 270 indicates that the antecedent (a component external to the dependent) is in the running state so that the dependent can be transitioned from the installable state 220 to the executable state 230 by way of the install change management operation 240. Examples for this configuration include hosted applications that can only be installed if the appropriate container of a web application server is not only installed, but also running. It is most advantageous to define a temporal relationship between the lifecycle states of components, instead of between their change management operations. As such, a temporal relationship specifies a constraint that is valid for both change management operations of a dependent. By connecting the lifecycle states of both antecedent and dependent, the temporal relationship 270 specifies two precedence constraints:

The antecedent is running to install a dependent.

The antecedent is running to uninstall a dependent.

Both of these precedence constraints are implied through connecting the lifecycle states.

Figure 3:
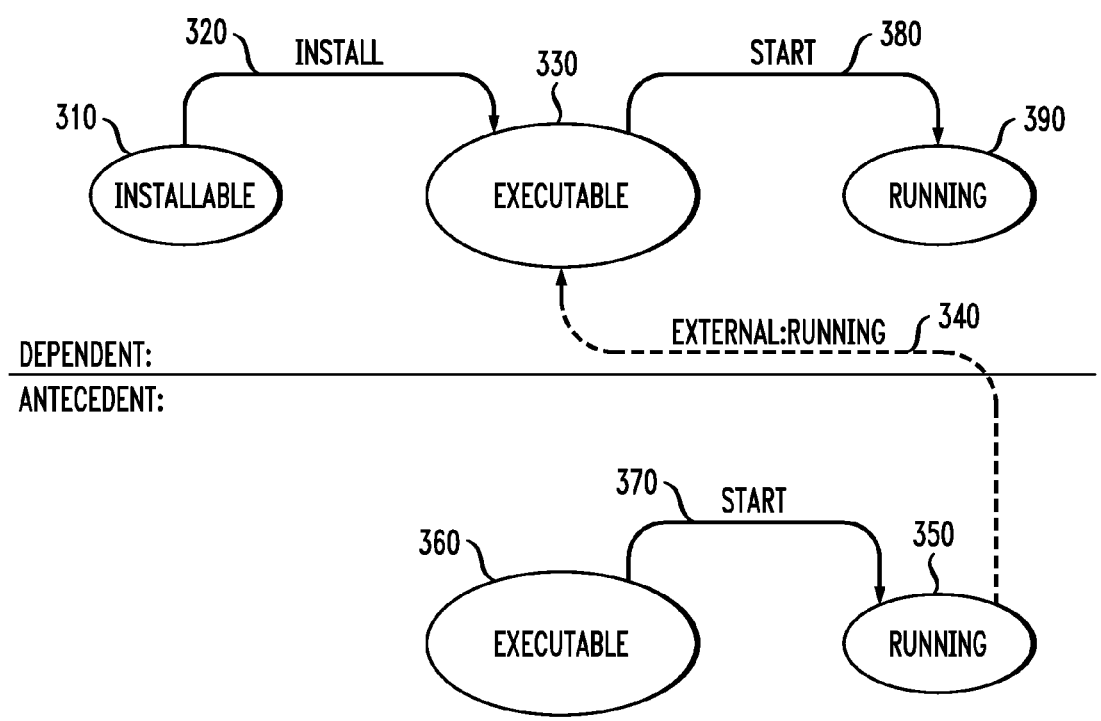
FIG. 3 is a diagram illustrating temporal relationships between lifecycle representations of an antecedent component and a dependent component, according to an embodiment of the present invention.

We now turn to FIG. 3, which is a diagram illustrating temporal relationships between lifecycle representations of an antecedent and a dependent, according to an embodiment of the present invention. We assume that the current state of the dependent is the installable state 310, whereas the current state of the antecedent is the executable state 360. Both current states are depicted in grey. State information can be obtained at run-time from a distributed computing system by way of diagnostic routines that are available from a variety of tools, which we summarize as status monitor. Further, we assume that a user has submitted a request for change, indicating that the dependent should be transitioned into the running state 390. This desired state is depicted in black. As we are dealing with a distributed computing system, the inventive techniques need to analyze both the internal lifecycle models of the two components as well as any temporal relationships that exist between the components. This is needed to make sure that the generated sequence of change is technically feasible.

One possible way to accomplish this is by navigating backwards from the desired state 390 across its predecessor states 330 until the current state 310 is reached. Whenever a temporal relationship 340 is encountered, an algorithm is recursively executed on the lifecycle model of the antecedent. The traversal of external relationships needs to be executed recursively because a component may be an antecedent and a dependent (for different components) at the same time. The output is a sequence of change management operations that safely transitions the involved components across a variety of states so that the desired state is reached. In a preferred embodiment of the invention, implementation may be achieved using a set of two stacks, one being the system stack onto which the current state of the system is pushed whenever a temporal relationship is encountered, the other being the plan stack, which contains a sequence of 3-tuples, each consisting of the change management operation, the component (for example, artifact) name, and the host component. For the example given in FIG. 3, the inventive techniques generate the following sequence of 3-tuples:

1. Install dependent on local host 320
2. Start antecedent on remote host 370
3. Start dependent on local host 380

For the purposes of completeness, the antecedent can be transitioned into the running state 350.

Figure 4:
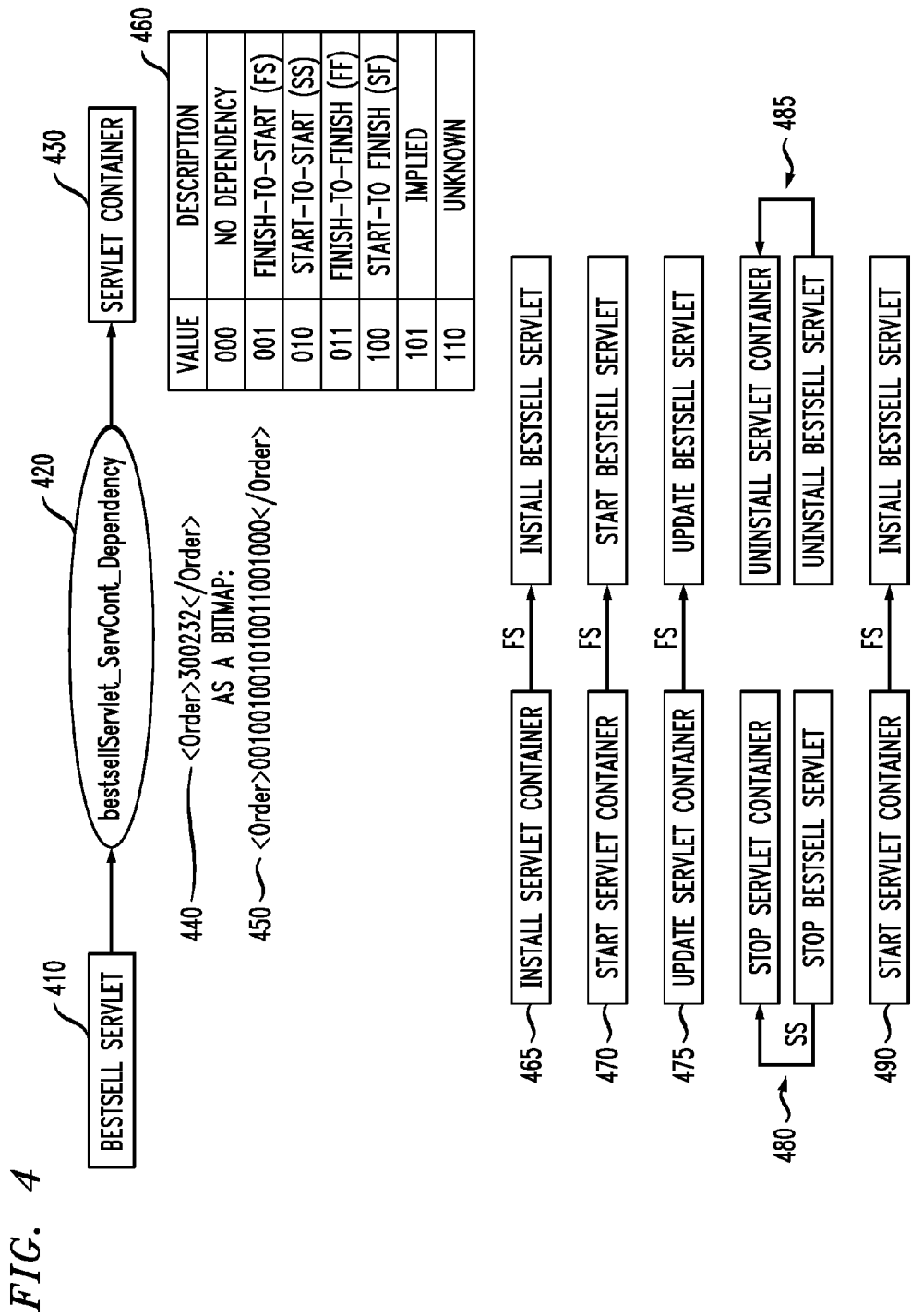
FIG. 4 is a diagram illustrating the representation of temporal relationships and their transformation into change management operation sequences, according to an embodiment of the present invention.

FIG. 4 is a diagram illustrating the representation of temporal relationships and their transformation into change management operation sequences, according to an embodiment of the present invention. One or more embodiments of the inventive techniques leverage concepts defined in Gantt charts, which are used in mathematical scheduling theory and project management. One embodiment of the invention preferably uses four precedence constraint types:

Finish-to-Start (FS): This precedence constraint expresses that task A finishes before task B can begin and is the default constraint in workflow management systems. An example in an electronic-commerce (ecommerce) context is that a servlet container is running (i.e., the task of starting it is completed) before a new servlet can be deployed to it.

Start-to-Start (SS): Task B cannot start until task A does. An example for this constraint type are nested transactions and units of work.

Finish-to-Finish (FF): Task B cannot finish before task A does. An example is wherein one cannot shutdown a system if the web application server is still running.

Start-to-Finish (SF): Task B cannot finish until task A starts. An example is wherein a fail-over server cannot be taken offline before the main server is up again. Note that there is a subtle difference between this constraint type and the aforementioned FS constraint type, because here the start of a task determines the end of its predecessor (in the simpler FS case, the start of a task depends on the ending of its predecessor).

The four task relationships are applicable to change management planning as well, as the following examples illustrate:

FS: A dtabase server is running before a database client can issue requests

SS: nested database transactions

FF: one is not shut a system down if the application server is still running

SF: Failover server B cannot be taken down until server A is back up again, or A database system cannot accept new requests until pending requests have been consolidated One or more embodiments of the inventive techniques uses the four different types of precedence constraints to annotate the aforementioned extended change management operations to express complex operational semantics resulting from the interaction of multiple managed resources, as depicted in FIG. 4. By way of example, a set of precedence constraints between a hosted application implemented as the bestsell servlet 410 and its hosting servlet container 430 is expressed by encoding the set of possible transitions as concatenated octets inside a temporal relationship termed 'bestsellServlet_ServCont_Dependency' 420. The encoding is done according to the table 460.

The decimal value 300232—encoded in the order attribute 440 of the temporal relationship—is translated into its binary representation 001001001010011001000 (450), which (given that three binary digits represent one task relationship type) indicates that:

1. There is a FS-type temporal constraint between install servlet container and install bestsell servlet 465. In other words, the install servlet container task is completed successfully before the install bestsell servlet task can be started.
2. There is a FS-type temporal constraint between start servlet container and start bestsell servlet 470. In other words, the start servlet container task is completed successfully before the start bestsell servlet task can be started.
3. There is a FS-type temporal constraint between update servlet container and update bestsell servlet 475. In other words, the update servlet container task is completed successfully before the update bestsell servlet task can be started.
4. There is a SS-type temporal constraint between stop servlet container and stop bestsell servlet 480, in other words, the stop bestsell servlet task is begun before the stop servlet container task can be started.
5. There is a FF-type temporal constraint between uninstall servlet container and uninstall bestsell servlet 485. In other words, the uninstall servlet container Task does not finish before the uninstall bestsell servlet task can be started.

6. There is a FS-type temporal constraint between start servlet container and install bestsell servlet 490. In other words, the start servlet container task is completed successfully before the install bestsell servlet task can be started.

The order in which the octets are concatenated are defined in a specific order to reduce ambiguity. In the example, the order is:

1. Install antecedent/install dependent,
2. Start antecedent/start dependent,
3. Update antecedent/update dependent,
4. Stop antecedent/stop dependent,
5. Uninstall antecedent/uninstall dependent,
6. Start antecedent/install dependent Such relationship specifications can either be created manually by a software developer or generated by an appropriately instrumented integrated development environment (IDE), which saves the precedence constraints as deployment descriptors.

Figure 5:
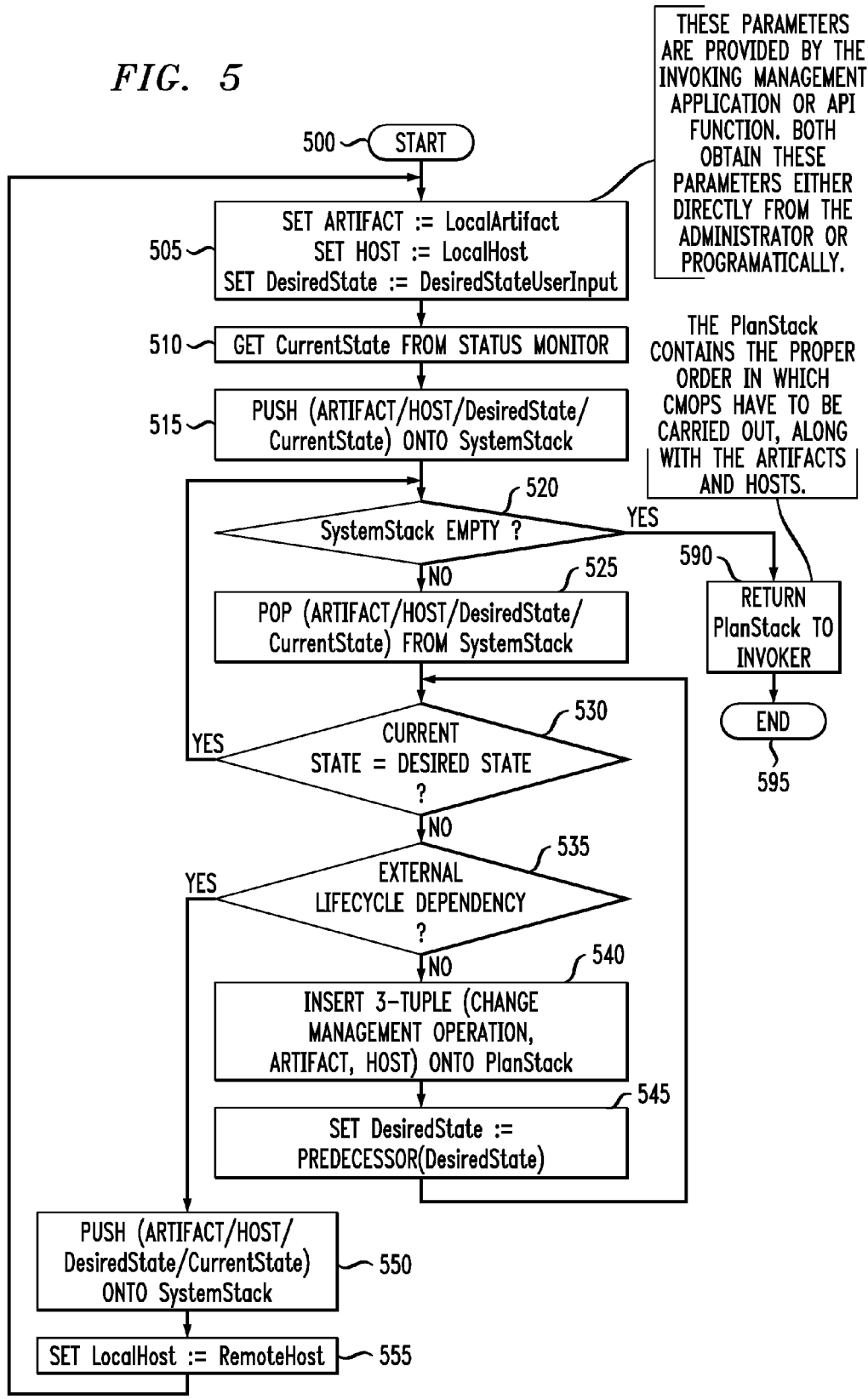
FIG. 5 is a flow diagram illustrating techniques for transforming temporal relationships into change management operation sequences, according to an embodiment of the present invention.

We now turn to FIG. 5, which is a flow diagram illustrating techniques for transforming temporal relationships into change management operation sequences according to an embodiment of the present invention. The technique begins at element 500 and proceeds as follows. Upon receipt of a new request—obtained either from an administrator or through automated invocation by a software component—three parameters are set. They describe the goal of the request. The artifact (the component under observation) is set to the name of the 'LocalArtifact', the host is set to the 'LocalHost, and the desired state is set according to the value in the request 505.

The next step includes determining the current state of the component by querying the status monitor 510. In order to initiate the processing, the 4-tuple representing the current context—containing artifact name, hostname, desired state and system state—is pushed onto the system stack 515. The test for emptiness of the system stack 520—which determines whether the technique terminates—is negative right after the initialization of the system stack with a new 4-tuple, which is subsequently removed from the system stack for processing 525.

In step 530 a test is carried out whether the CurrentState is equal to the DesiredState. If this is the case—a condition indicating that no further processing needs to be done for a given component—the technique proceeds to step 520. If not, the technique continues at step 535, which tests a given lifecycle state for occurrence of a temporal relationship with an antecedent. If this is not the case, the technique traverses the lifecycle states of the current component (the dependent) backwards to place a 3-tuple —consisting of a change management operation, the artifact, and the hostname—on the plan stack 540.

The plan stack contains the allowable sequence of change management operations in reverse order, so that the proper order can be obtained by simply popping the 3-tuples from the stack until it is empty. Step 545 includes the DesiredState being set to the predecessor of the DesiredState, because the technique has determined in step 540 which change management operation allows the DesiredState to be reached. One can think of the DesiredState as a pointer that moves backwards through the lifecycle states of a component whenever a change management operation has been found (and pushed onto the plan stack) that allows the new DesiredState to reach the DesiredState of the previous iteration.

Step 530 includes testing the new DesiredState against the (fixed) CurrentState (which contains the actual state of the component). In case the DesiredState is equal to the CurrentState no further processing is needed for a given component, and the technique proceeds to step 520, where the system stack is tested for emptiness. If the system stack is empty, the technique proceeds to step 590, which consists in returning the content of the plan stack to the invoker, and subsequently terminates at step 595.

Whenever the technique encounters a temporal relationship in step 535, the current context is saved on the system stack 550, and the technique traverses the relationship by setting the LocalHost to the RemoteHost 555. The system stack indicates whether one or more 4-tuples need to be processed. An element is added to it whenever a new antecedent needs to be evaluated because a temporal relationship has been identified. Whenever a switch onto a new host has occurred, the technique is re-initialized in step 505. We note that the usage of two stacks, system stack and plan stack, facilitates working with nested temporal relationships.

FIG. 6 is a diagram illustrating the textual representation of temporal relationships by way of a deployment descriptor, according to an embodiment of the present invention. A deployment descriptor may contain information about:

the change management operation that needs to be carried out, for example, install, update, configure, uninstall, the roles and names of the components of a distributed computing system, the location constraints that may exist between the building blocks of a distributed computing system, such as co-location (a component is present on the same system as another component) or ex-location (is not present on the same system), temporal relationships that may exist between the building blocks of a distributed computing system, such as 'X is installed before Y'. Examples of temporal relationships in FIG. 6 are the various checkItems indicating that 'DB2 is installed (i.e., in the executable state) before Configuring a JDBC Connector' (620) and 'DB2 is started (i.e., in the running state) before Configuring a JDBC Connector' (630). Such checkItems are typically grouped into alternatives (610) that can be taken to fulfill a requirement (640).

In a specific embodiment of the present invention, a deployment descriptor may contain—in addition to the aforementioned data—information that relates to the specific hardware characteristics of a computing system (such as computer processing unit (CPU) speed, random access memory (RAM) or total/available disk space) or names, internet protocol (IP) addresses and symbolic names of computing systems. However, one having skill in the relevant art will recognize that modifications in the way of what data is contained within deployment descriptors, as well as their representation, may be made without departing from the spirit and scope of the present invention.

Based on these temporal dependency relationship specifications, a system creating change plans would be able to derive the correct order for change management operations that need to be applied in distributed environments.

Figure 7:
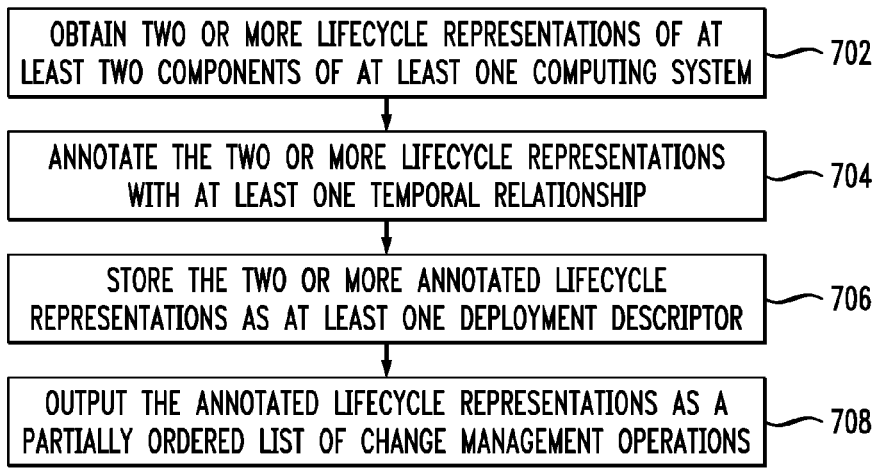
FIG. 7 is a flow diagram illustrating a method for expressing temporal relationships between lifecycle representations, according to an embodiment of the present invention.

We now turn to FIG. 7, which is a flow diagram illustrating a method for expressing temporal relationships between lifecycle representations, according to one embodiment of the invention. Step 702 includes obtaining two or more lifecycle representations of at least two components of at least one computing system. The lifecycle representations may include at least one of an arbitrary set of states and change management operations. Each component may include at least one of software, hardware, middleware and networking components. Step 704 includes annotating the two or more lifecycle representations with at least one temporal relationship. The at least one temporal relationship may exist between two states in the lifecycle of at least two components. Also, the at least one temporal relationship may be annotated with a precedence constraint (for example, a FS/SS/SF/SS constraint may be attached to a temporal relationship). Step 706 includes storing the two or more annotated lifecycle representations as at least one deployment descriptor, wherein the at least one deployment descriptor is useable for managing the at least one computing system. The at least one deployment descriptor may include information relating to hardware characteristics of a computing system, as well as names, (IP) addresses and symbolic names of computing systems.

Annotating lifecycle representations with temporal relationships may include traversing the temporal relationships, establishing pair-wise links between lifecycle representations of two or more different managed resources and may also include generating precedence constraints.

One or more embodiments of the invention may include step 708, the step of outputting the annotated lifecycle representations as at least one partially ordered list of change management operations. Also, in one or more embodiments of the invention, the at least two or more components may be co-located on an identical hosting environment, or the at least two or more components may be located on different hosting environments. In yet another embodiment of the invention, one component may be a hosting environment for another component (that is, one component hosts another component, allowing the latter to execute within the former).

Figure 8:
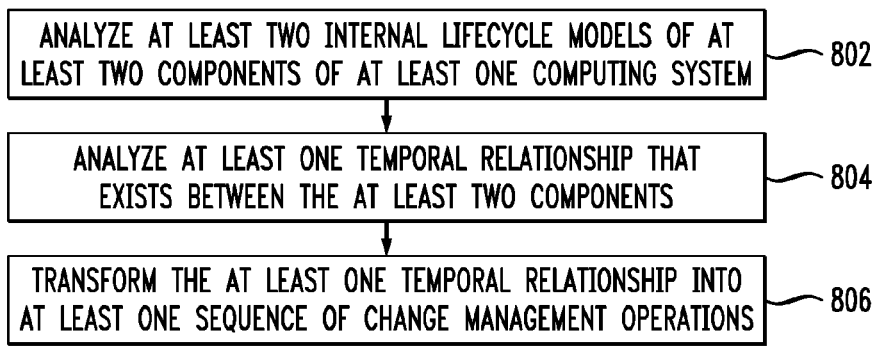
FIG. 8 is a flow diagram illustrating a method for generating a sequence of change management operations, according to an embodiment of the present invention.

FIG. 8 is a flow diagram illustrating a method for generating a sequence of change management operations, according to one embodiment of the invention. Step 802 includes analyzing at least two internal lifecycle models of at least two components of at least one computing system. Step 804 includes analyzing at least one temporal relationship that exists between the at least two components. Step 806 includes transforming the at least one temporal relationship into at least one sequence of change management operations for use in managing the at least one computing system.

A variety of techniques, utilizing dedicated hardware, general purpose processors, firmware, software, or a combination of the foregoing may be employed to implement one or more embodiments of the present invention. One or more embodiments of the invention can be implemented in the form of a computer product including a computer useable medium with computer useable program code for performing the method steps indicated. Furthermore, one or more embodiments of the invention can be implemented in the form of an apparatus including a memory and at least one processor that is coupled to the memory and operative to perform exemplary method steps.

Figure 9:
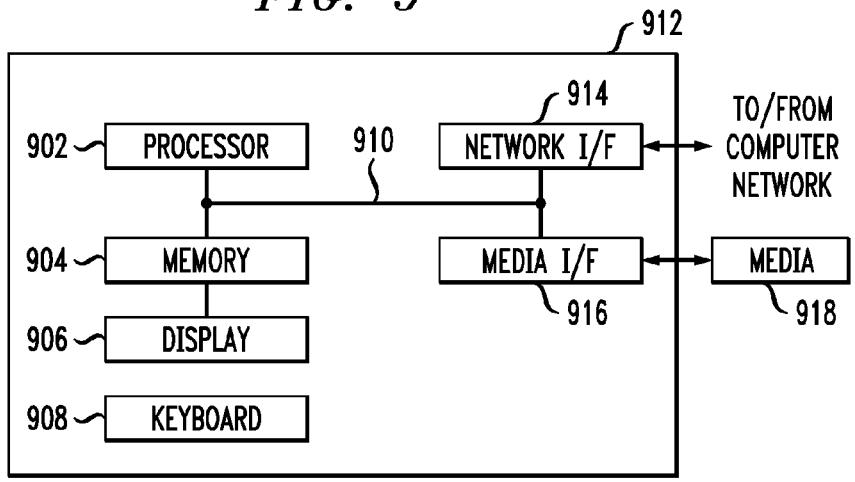
FIG. 9 is a system diagram of an exemplary computer system on which one or more embodiments of the present invention can be implemented.

One implementation of the present invention makes substantial use of software running on a general purpose computer or workstation. With reference to FIG. 9, such an implementation might employ, for example, a processor 902, a memory 904, and an input and/or output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 902, memory 904, and input and/or output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-useable or computer-readable medium (for example, media 918) providing program code for use by or in connection with a computer or any instruction execution system. For the purposes of this description, a computer useable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 904), magnetic tape, a removable computer diskette (for example media 918), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code is retrieved from bulk storage during execution.

Input and/or output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for expressing temporal relationships between lifecycle representations, the method comprising the steps of:
obtaining two or more lifecycle representations of at least two components of at least one computing system, wherein the at least two components comprise a first component and a second component, and wherein the two or more lifecycle representations comprise at least one of an arbitrary set of states and change management operations;
annotating the two or more lifecycle representations with at least one temporal relationship, wherein the at least one temporal relationship exists between two states in the lifecycle representations of the at least two components, wherein the at least one temporal relationship links a first state in the lifecycle representation of the first component with a second state in the lifecycle representation of the second component;
storing the two or more annotated lifecycle representations as at least one deployment descriptor, wherein the at least one deployment descriptor is useable for managing the at least one computing system; and
outputting the two or more annotated lifecycle representations as at least one partially ordered list of change management operations.

2. The method of claim 1, wherein the step of annotating the two or more lifecycle representations with at least one temporal relationship comprises traversing the at least one temporal relationship.

3. The method of claim 1, wherein the step of annotating the two or more lifecycle representations with at least one temporal relationship comprises generating at least one precedence constraint.

4. The method of claim 1, wherein the at least one deployment descriptor comprises information relating to hardware characteristics of a computing system.

5. The method of claim 1, wherein the at least one deployment descriptor comprises at least one of names, internet protocol (IP) addresses and symbolic names of at least one computing system.

6. The method of claim 1, wherein each component comprises at least one of software, hardware, middleware and networking components.

7. The method of claim 1, wherein the step of annotating the two or more lifecycle representations with at least one temporal relationship comprises establishing at least one pair-wise link between two or more lifecycle representations of two or more different managed resources.

8. The method of claim 1, wherein the at least one temporal relationship may be annotated with a precedence constraint.

9. The method of claim 1, wherein the at least two or more components are co-located on an identical hosting environment.

10. The method of claim 1, wherein the at least two or more components are located on different hosting environments.

11. The method of claim 1, wherein one component is a hosting environment for another component.

12. An apparatus for expressing temporal relationships between lifecycle representations, comprising:
a memory; and
at least one processor coupled to the memory and operative to:
obtain two or more lifecycle representations of at least two components of at least one computing system, wherein the at least two components comprise a first component and a second component, and wherein the two or more lifecycle representations comprise at least one of an arbitrary set of states and change management operations;
annotate the two or more lifecycle representations with at least one temporal relationship, wherein the at least one temporal relationship exists between two states in the lifecycle representations of the at least two components, wherein the at least one temporal relationship links a first state in the lifecycle representation of the first component with a second state in the lifecycle representation of the second component;
store the two or more annotated lifecycle representations as at least one deployment descriptor, wherein the at least one deployment descriptor is useable for managing the at least one computing system; and
output the two or more annotated lifecycle representations as at least one partially ordered list of change management operations.

13. The apparatus of claim 12, wherein each component comprises at least one of software, hardware, middleware and networking components.

14. The apparatus of claim 12, wherein the step of annotating the two or more lifecycle representations with at least one temporal relationship comprises establishing at least one pair-wise link between two or more lifecycle representations of two or more different managed resources.

15. A computer program product comprising a computer useable storage memory having computer useable program code for expressing temporal relationships between lifecycle representations, the computer program product including:
computer useable program code for obtaining two or more lifecycle representations of at least two components of at least one computing system, wherein the at least two components comprise a first component and a second component, and wherein the two or more lifecycle representations comprise at least one of an arbitrary set of states and change management operations;
computer useable program code for annotating the two or more lifecycle representations with at least one temporal relationship, wherein the at least one temporal relationship exists between two states in the lifecycle representations of the at least two components, wherein the at least one temporal relationship links a first state in the lifecycle representation of the first component with a second state in the lifecycle representation of the second component;
computer useable program code for storing the two or more annotated lifecycle representations as at least one deployment descriptor, wherein the at least one deployment descriptor is useable for managing the at least one computing system; and
computer useable program code for outputting the two or more annotated lifecycle representations as at least one partially ordered list of change management operations.

16. The computer program product of claim 15, wherein each component comprises at least one of software, hardware, middleware and networking components.

17. The computer program product of claim 15, wherein the step of annotating the two or more lifecycle representations with at least one temporal relationship comprises establishing at least one pair-wise link between two or more lifecycle representations of two or more different managed resources.

* * * * *